United States Patent
Wang

(10) Patent No.: US 10,523,996 B2
(45) Date of Patent: Dec. 31, 2019

(54) METHOD AND SYSTEM FOR BACKWARD RECORDING

(71) Applicant: THOMSON LICENSING, Issy les Moulineaux (FR)

(72) Inventor: Nan Wang, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/300,121

(22) PCT Filed: Mar. 28, 2014

(86) PCT No.: PCT/CN2014/074302
§ 371 (c)(1),
(2) Date: Sep. 28, 2016

(87) PCT Pub. No.: WO2015/143717
PCT Pub. Date: Oct. 1, 2015

(65) Prior Publication Data
US 2017/0142476 A1 May 18, 2017

(51) Int. Cl.
*H04N 21/433* (2011.01)
*H04N 21/431* (2011.01)
*H04N 5/775* (2006.01)
*H04N 5/781* (2006.01)
*H04N 5/91* (2006.01)
(Continued)

(52) U.S. Cl.
CPC ......... *H04N 21/4334* (2013.01); *H04N 5/775* (2013.01); *H04N 5/781* (2013.01); *H04N 5/91* (2013.01); *H04N 21/4312* (2013.01); *H04N 21/4331* (2013.01); *H04N 21/4821* (2013.01); *H04N 21/6587* (2013.01)

(58) Field of Classification Search
None
See application file for complete search history.

(56) References Cited

U.S. PATENT DOCUMENTS 6,591,058 B1 * 7/2003 O'Connor ............ G11B 27/034
386/248
7,055,167 B1 5/2006 Masters
(Continued)

FOREIGN PATENT DOCUMENTS

CN 1947422 4/2007
CN 101399947 4/2009
(Continued)

*Primary Examiner* — Fernando Alcon
(74) *Attorney, Agent, or Firm* — Brian J. Dorini, Esquire; Robert D. Shedd, Esq.

(57) ABSTRACT

It is provided a method for backward recording in a device having a time-shift function, including: launching the time-shift function, when a user select one program, to record the program on a time-shift buffer; receiving an instruction to record a scene backward within the program being viewed by a user: acquiring information on the program from EIT(Event Information Table); determining a type of the program on the basis of the information; setting a duration of the backward recording dependent on the type of the program; and copying a data, which is stored in the time-shift buffer and corresponds to the duration backward from the time of receiving the instruction, in a storage of the device.

10 Claims, 3 Drawing Sheets

(51) Int. Cl.
*H04N 21/482* (2011.01)
*H04N 21/6587* (2011.01)

(56) References Cited

U.S. PATENT DOCUMENTS

| | | |
|---|---|---|
| 7,263,280 B2 | 8/2007 | Bullock et al. |
| 8,195,029 B2 | 6/2012 | Fujiwara et al. |
| 8,442,388 B1 | 5/2013 | Panje |
| 9,374,610 B1 * | 6/2016 | Chang ............... H04N 21/4312 |
| 2001/0028785 A1 | 10/2001 | Okada |
| 2002/0174430 A1 * | 11/2002 | Ellis .................... G11B 27/005 |
| | | 725/46 |
| 2005/0089304 A1 | 4/2005 | Miyagawa et al. |
| 2005/0138659 A1 | 6/2005 | Boccon-Gibod et al. |
| 2005/0283802 A1 | 12/2005 | Corl |
| 2006/0020966 A1 | 1/2006 | Poslinski |
| 2006/0171658 A1 | 8/2006 | Josemsen et al. |
| 2006/0253865 A1 | 11/2006 | Lee et al. |
| 2008/0107396 A1 | 5/2008 | Chung et al. |
| 2008/0120680 A1 | 5/2008 | Kim et al. |
| 2009/0089850 A1 | 4/2009 | Nakajima et al. |
| 2009/0238543 A1 | 9/2009 | Guo |
| 2009/0293092 A1 | 11/2009 | Guo et al. |
| 2010/0178023 A1 | 7/2010 | Fukai |
| 2010/0178025 A1 * | 7/2010 | Bhogal ............... G11B 27/034 |
| | | 386/207 |
| 2013/0129309 A1 | 5/2013 | Panje |
| 2014/0189042 A1 * | 7/2014 | Chen .................. H04N 21/4756 |
| | | 709/213 |
| 2015/0141139 A1 * | 5/2015 | Trombetta ............... H04N 5/76 |
| | | 463/31 |
| 2015/0251093 A1 * | 9/2015 | Trombetta .............. A63F 13/49 |
| | | 463/24 |

FOREIGN PATENT DOCUMENTS

| | | |
|---|---|---|
| CN | 101399965 | 4/2009 |
| CN | 101431645 | 5/2009 |
| CN | 101505391 | 8/2009 |
| CN | 101588473 | 11/2009 |
| CN | 102595235 | 7/2012 |
| EP | 1309191 | 5/2003 |
| GB | 2434025 | 7/2007 |
| JP | H11234599 | 8/1999 |
| JP | 2002044542 | 2/2002 |
| JP | 2005130139 | 5/2005 |
| JP | 2006019793 | 1/2006 |
| JP | 2006314109 | 11/2006 |
| JP | 4124110 | 7/2008 |
| JP | 2010050692 | 3/2010 |
| WO | WO2005104558 | 11/2005 |

* cited by examiner

METHOD AND SYSTEM FOR BACKWARD RECORDING

This application claims the benefit, under 35 U.S.C. § 365 of International Application of PCT/CN2014/074302 filed Mar. 28, 2014, which was published in accordance with PCT Article 21(2) on Oct. 1, 2015.

TECHNICAL FIELD

The present disclosure relates to backward recording, and more particularly related to a method and a system for backward recording in a device having a time-shift function.

BACKGROUND ART

In the current STB program recording application based on DVB (Digital Video Broadcasting) standard, there are two kinds of TV recording modes: one is "instant recording," and the other is "scheduled recording." In the "instant recording mode," a user presses a recording button to launch a record from a specified time which the user is interesting in. When the user thinks that the impressive scene is over, it will be completed by pressing the recording button again to complete the recording. In the "scheduled recording" mode, from the EIT (Event Information Table) transmitted in the DVB PSI/SI (Program Specific Information/Service Information) tables, a user can select the specified events to record the related program in advance. The recording will be launched automatically when the event time is started and will be finished when the event is over. For the two methods mentioned above, the recorded program is stored in the internal/external hard disk. A user can watch the recorded program in anytime.

However, actually when a user wants to record a live TV program, and the user is only interested in some special scenes, but the user does not know when the interesting points will happen in advance. For example, in a soccer game, fans love to record the scene when a goal happens, but it cannot be known in advance. If users use instant recording, the goal during a match is not known in advance. It is not necessary for users to use scheduled recording to record all of the soccer game. Users are only interested in the goal happens. If a soccer game is totally recorded, when users watch the 90 minutes recording, usually they will use the trick mode method to seek to the goal time to watch the goal scene. The interesting points during a game are usually not over 10 minutes. So it is not necessary to record other 90% contents on the disk.

SUMMARY

To resolve the problems above, a concept of "Backward Recording" is provided by the present invention, which concept may be implemented by a button called "Backward Recording" button that can be added on a remote controller. This allows users to only record a program in the past specified time. For example: for a film, when a user watches a scene that is impressive, and the user thinks that it is valuable to reserve, then can press the "Backward Recording" button to record the scene in past 5 minutes to record the impressive scene. For a football game, after a goal happens, if a user presses the "Backward Recording" button, it will record the game in past 1 minute to include all the goal process.

According to an aspect of the present invention, it is provided a method for backward recording in a device having a time-shift function, including: launching the time-shift function, when a user select one program, to record the program on a time-shift buffer; receiving an instruction to record a scene backward within the program being viewed by a user: acquiring information on the program from EIT (Event Information Table); determining a type of the program on the basis of the information; setting a duration of the backward recording dependent on the type of the program; and copying a data, which is stored in the time-shift buffer and corresponds to the duration backward from the time of receiving the instruction, in a storage of the device.

In a first preferred embodiment, the time-shift function is activated in accordance with a default rule or an instruction by the use.

In a second preferred embodiment, the receiving an instruction is implemented by a backward recording button provided in a user interface of the device.

In a third preferred embodiment, the information on the program is EIT p/f information or content_nibbel_level_1 received together with the program.

In a fourth preferred embodiment, the setting is implemented by indicating a proposed duration dependent on the type of the program to the user and being selected by the user.

In a fifth preferred embodiment, the setting is implemented by selecting default duration dependent or independent on the type of the program.

In a sixth preferred embodiment, further including the receiving instruction to playback the recorded data stored in the backward recording directory in a storage of the device via a recording playback button provided on the user interface.

According to an aspect of the present invention, it is provided a computer program product downloadable from a communication network and/or recorded on a medium readable by computer and/or executable by a processor, comprising program code instructions for implementing the foregoing method.

According to an aspect of the present invention, it is provided non-transitory computer-readable medium comprising a computer program product recorded thereon and capable of being run by a processor, including program code instructions for implementing the foregoing method.

According to an aspect of the present invention, it is provided a system for backward recording in a device having a time-shift function, comprising a processor to implement: launching the time-shift function, when a user select one program, to record the program on a time-shift buffer; receiving an instruction to record a scene backward within the program being viewed by a user: acquiring information on the program from EIT (Event Information Table); determining a type of the program on the basis of the information; setting a duration of the backward recording dependent on the type of the program; and copying a data, which is stored in the time-shift buffer and corresponds to the duration backward from the time of receiving the instruction, in a storage of the device.

In a first preferred embodiment, the time-shift function is activated in accordance with a default rule or an instruction by the use.

In a second preferred embodiment, the receiving an instruction is implemented by a backward recording button provided in a user interface of the device.

In a third preferred embodiment, the information on the program is EIT p/f information or content_nibbel_level_1 received together with the program.

In a fourth preferred embodiment, the setting is implemented by indicating a proposed duration dependent on the type of the program to the user and being selected by the user.

In a fifth preferred embodiment, the setting is implemented by selecting default duration dependent or independent on the type of the program.

In a sixth preferred embodiment, further including the receiving instruction to playback the recorded data stored in the backward recording directory in a storage of the device via a recording playback button provided on the user interface.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DESCRIPTION OF EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

An embodiment of the present invention includes "Backward Recording" function, which lets a user record only interesting scenes in the past time. By adding the function, it will be not necessary to record all of TV programs and the disk space of the STB storage device can be saved.

Figure 1:
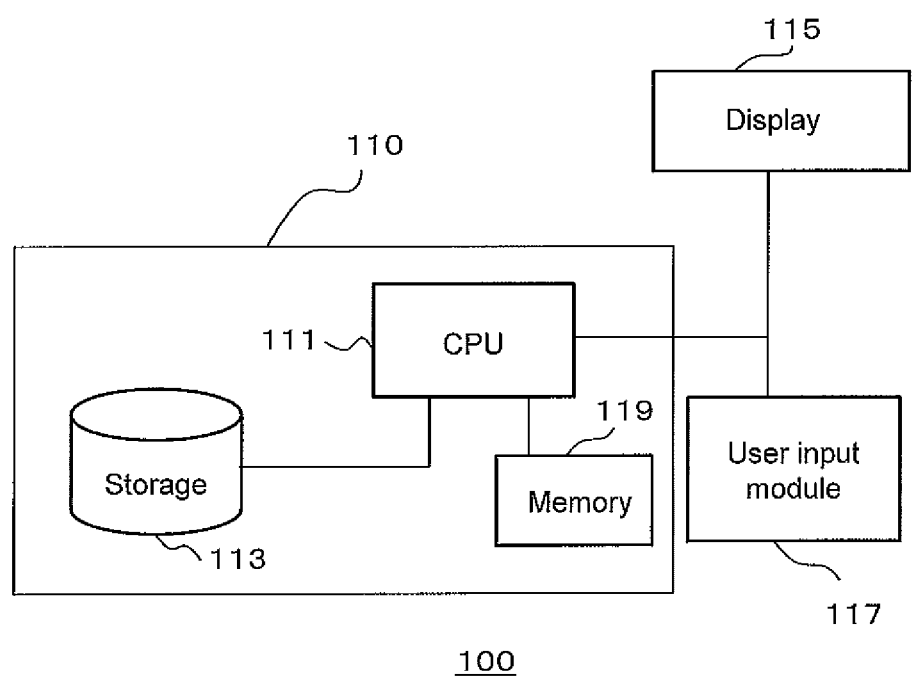
FIG. 1 illustrates an exemplary block diagram of a system 100 according to an embodiment of the present invention.

FIG. 1 illustrates an exemplary block diagram of a system 100 according to an embodiment of the present invention. The system 100 can be a TV set, computer system, tablet, and so on. The system 100 comprises a CPU (Central Processing Unit) 111, a storage 113, a display 115, and a user input module 117. A memory 119 such as RAM (Random Access Memory) may be connected to the CPU 111 as shown in FIG. 1. A device 110 including the CPU 111, the storage 113, and the memory 119 can be a STB (Set Top Box) or a recorder that is preferably based on DVB standard.

The display 115 is configured to visually present text, image, video and any other contents to a user of the system 110. The storage 113 is configured to store software programs and data for the CPU 111 to drive and operate the process to record contents in accordance with the embodiment of the present invention. The user input module 117 may include keys or buttons to input characters or commands and also comprises a function for recognizing the characters or commands input with the keys or buttons. The user input module 117 can be omitted in the system depending on use application of the system.

Figure 2:
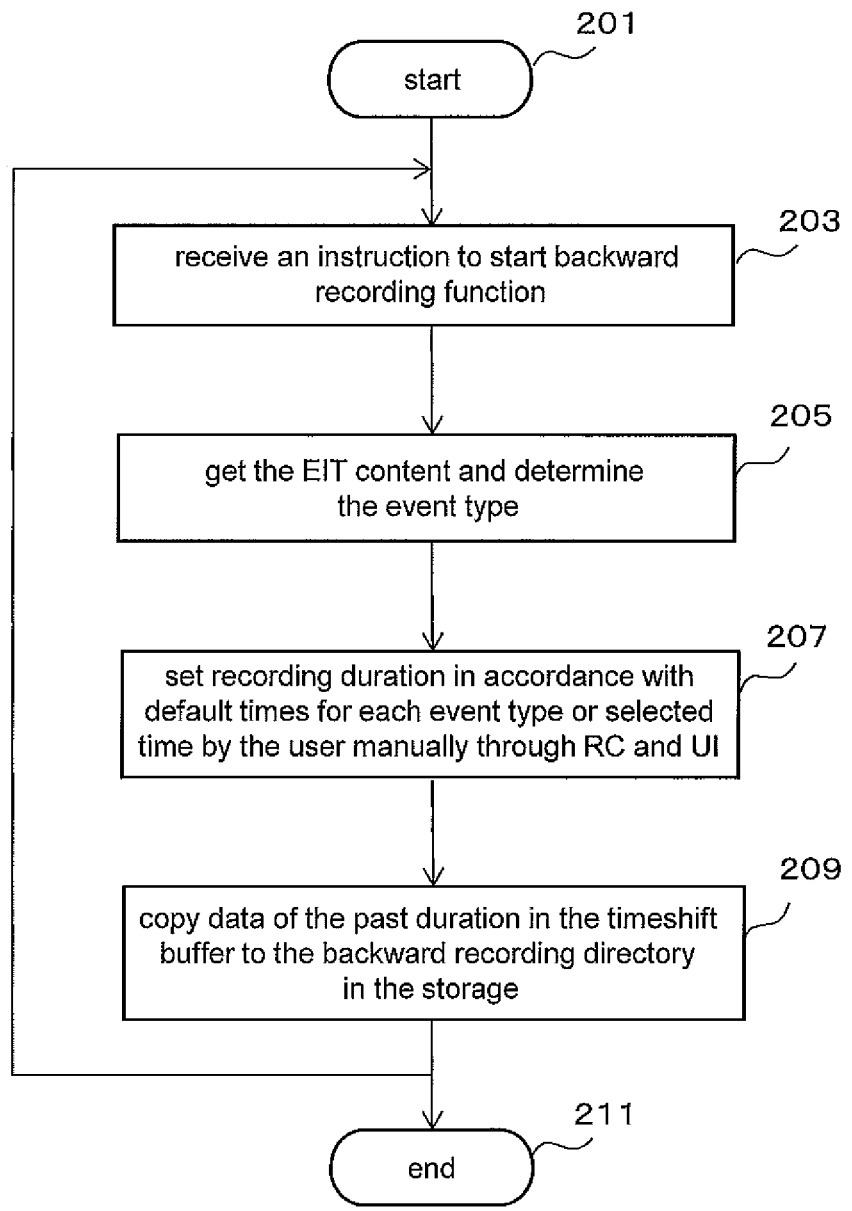
FIG. 2 illustrates a flow chart illustrating how backward recording function is implemented according to an embodiment of the present invention.

FIG. 2 illustrates a flow chart illustrating how backward recording function is implemented according to an embodiment of the present invention. As a precondition, time-shift function must be enabled in the device 110 to support the automatic recording function. The time-shift function is to buffer at least one program in predetermined period, such as several hours or several weeks in the past. In addition to this, one "record backward" button is added for user's selections on the user input module 117. The button can be added via the user input module 117 to provide the key available.

At step 201, when the device 110 is boot up and zapping to a specified channel to watch an event by a user, the time-shift buffer is automatically launched. The default buffer size is 2 hours which means it can automatically buffer 2 hours program. The size of default buffer size can be changed as needed. The device 110 can access EIT information by EIT manager to acquire information on the event. The EIT manager is installed in the device 110. In this embodiment, the time-shift function is launched when a user select one event, and however, the time-shift function may be applied to all of events during activation of the device 110 automatically. The system may recognize that a user select one service after predetermined time has past.

At step 203, the device 110 receives an instruction to start backward recording function for an event which a user is watching when the user finds past scene is meaningful for recording and presses the "record backward" button.

At step 205, the device 110 gets EIT information for the event, and determines the event type. As described below, Content Descriptors of EIT p/f information content_nibbel_level_1 can be used to determine the event type.

At step 207, the device 110 sets recording duration in accordance with default times for each event type or selected time by the user manually through the user input module 117.

At step 209, the device 110 copies data of the past duration from the time of receiving the instruction stored in the time-shift buffer to the "Backward Recording" directory in the storage 113 of the device 110. The storage could be internal/external hard disk.

After the recording completion, the user can playback the recorded event like instant/scheduled recording from the stored directory. There are two methods how to store data in the record library as follows:

1. Program type: For example, there are movie, song, and sports sub-directory under the record library directory; and 2. Record time (and/or date): For example, there are 2014-01-01, and 2014-01-02 sub-directory under the record library directory.

As described above, The backward recording function can be organized with the program type as it can be got from EIT event information. It also can be organized with the time sequence. If the device 110 is turned off, go to step 211 to terminate the backward recording function. Otherwise, backward recording function continues and is ready to next recording.

In one embodiment, the default backward recording time is set in accordance with an event type which a user is watching. If the even type is Sports, the default backward recording time is 1 minute. The EIT p/f information is utilized to judge the event type. If the program is a sport game, the backward recording function is typically for a scene a goal happens. If the event type is Movie/Drama, the default backward recording time is 10 minutes. The most impressive of a film scene is about 10 minutes. If the event type is Music/Ballet/Dance, the default backward recording time is 4 minutes. Typically one song duration is about 4 minutes. By default, a message to let user choose how much time the user wants to record for the past scene may be presented.

The referred EIT p/f information is for content descriptor used in the EIT present/following information. Table1-1 describes the content descriptor definition defined in DVB-SI standard (ETSI 300 468). If there is no content descriptor, then the default backward recording time is 5 minutes.

TABLE 1-1

Content Descriptor

| Syntax | Number of bits | Identifier |
| --- | --- | --- |
| Content Descriptor ( ) { | | |
| descriptor _tag | 8 | Uimbsf |
| descriptor_length | 8 | Uimbsf |
| For (I =0; i<N; i++) { | | |
| content_nibbel_level_1 | 4 | Uimbsf |
| content_nibbel_level_2 | 4 | Uimbsf |
| User_byte | 8 | Uimbsf |
| } | | |

The content_nibbel_level_1 is also defined in ETSI 300468. It is defined with different event type. For different events, they can be mapped to backward recording default durations. For example, a movie event's interesting point may last 10 minutes for backward recording.

TABLE 1-2

Content Nibbel_level_1 definition and map to the default backward recording duration

| Content_nibbel_level_1 code | Description | Default backward recording duration (minutes) |
| --- | --- | --- |
| 0x1 | Movie/Drama: | 10 |
| 0x2 | News/Current affairs: | 1 |
| 0x3 | Show/Game show: | 2 |
| 0x4 | Sports: | 1 |
| 0x5 | Children's/Youth programmes: | 3 |
| 0x6 | Music/Ballet/Dance: | 4 |
| 0x7 | Arts/Culture (without music): | 5 |
| 0x8 | Social/Political issues/Economics: | 5 |
| 0x9 | Education/Science/Factual topics: | 5 |
| 0x0A | Leisure hobbies: | 5 |
| 0x0B | Special characteristics: | 5 |
| Others | Others | 5 |

Figure 3:
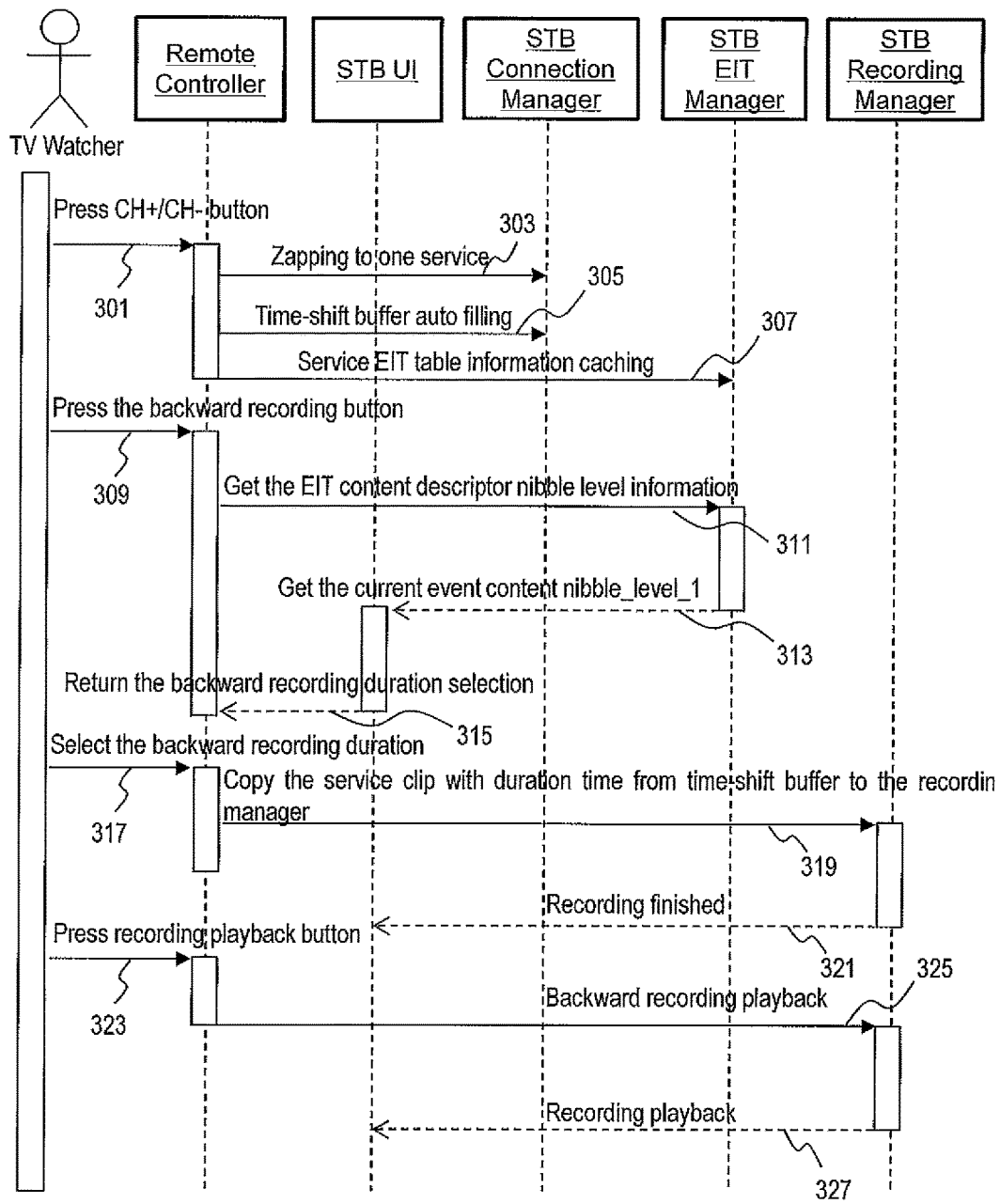
FIG. 3 illustrates system chart showing how a user implements backward recording function according to an embodiment of the present invention.

FIG. 3 illustrates system chart showing how a user implements backward recording function according to an embodiment of the present invention in more details. In this embodiment, the device 110 is a STB. A user watching TV presses CH+/CH− button (301) and changes a channel to one service (303). The time-shift function is enabled in the STB; and the time-shift buffer automatically filling (305). The EIT table information is available by STB EIT Manager (307).

The user presses the backward recording button when the user finds past scene is meaningful for recording (309). The STB acquires the current service content_nibbel_level_1 from the EIT content descriptor nibbel level information (311, 313). The STB can also utilize EIT p/f information instead. The STB UI can indicate proposed recording duration in accordance with the content descriptor to let user select it (317). Alternatively, the recording duration can be set as a default relating to/non-relating to the content descriptor. Alternatively, both approach can be applied simultaneously to let the user select accordingly.

The STB copies the service crip with the recording duration from the time-shift buffer to the "Backward Recording" directory in the storage of the STB via the recording manager. The recoding starts from the time when the user presses the backward recording button and records backward the service crip within the recording duration (319). When the recording is finished, the STB UI may indicates it to the user (321). The user can playback the recorded service crip like instant/scheduled recording for the stored directory. For playback, the user presses a recording playback button (323). The STB retrieves the data stored in the "Backward Recording" directory in the storage via STB recording manager (325) to playback (327).

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method of storing data, the method comprising:
   upon selection of a broadcast channel in a device for reception of broadcast channels, automatically storing of data from said broadcast channel received by said device in a first memory while said selected broadcast channel is being received;
   receiving an instruction to store, in a second memory, a previously received part of an event on said selected broadcast channel;
   obtaining, in response to the instruction to store, a duration of the previously received part to store in the second memory, said duration being dependent on an event type of said event on said selected broadcast channel when receiving the instruction, said event type being obtained from service information related to the selected broadcast channel; and
   selectively, in response to the instruction to store, copying a portion of the data from the first memory to the second memory, an end of the portion corresponding to a time of receiving the instruction and a beginning of the portion corresponding to the duration backward from the time of receiving the instruction.

2. The method according to claim 1, wherein the instruction is received through a recording button.

3. The method according to claim 1, wherein the service information comprises an Event Information Table.

4. The method according to claim 1, further comprising receiving an instruction to playback the data stored in the second memory via a recording playback button.

5. A device for storing data, comprising:
   a first memory;
   a second memory;
   a processor configured to:
   upon selection of a broadcast channel in a device for reception of broadcast channels, automatically store data from said broadcast channel received by said device in said first memory while said selected broadcast channel is being received;

receive an instruction to record, in said second memory, a previously received part of an event on said selected broadcast channel;

obtain, in response to the instruction to record, a duration of the previously received part to record in the second memory, said duration being dependent on an event type of said event on said selected broadcast channel when receiving the instruction, said event type being obtained from service information related to the selected broadcast channel; and selectively, in response to the instruction to record, copy a portion of the data from the first memory to the second memory, an end of the portion corresponding to a time of receiving the instruction and a beginning of the portion corresponding to the duration backward from the time of receiving the instruction.

6. The device according to claim 5, further comprising a user input module comprising a recording button, the processor being further configured to receive the instruction through the recording button.

7. The device according to claim 5, wherein the processor is further configured to obtain the event type from an Event Information Table comprised in said service information.

8. The device according to claim 5, wherein the processor is further configured to receive an instruction to playback the data stored in the second memory via a recording playback button.

9. A computer program product for a programmable apparatus, the computer program product comprising a sequence of instructions for implementing the method according to claim 1, when loaded into and executed by the programmable apparatus.

10. A non-transitory computer-readable medium comprising a computer program product recorded thereon and capable of being run by a processor, including program code instructions for implementing the method according to claim 1.

* * * * *